United States Patent [19]

Maitra

[11] Patent Number: 5,623,647
[45] Date of Patent: Apr. 22, 1997

[54] APPLICATION SPECIFIC CLOCK THROTTLING

[75] Inventor: Amit K. Maitra, Hillsboro, Oreg.

[73] Assignee: Intel Corporation, Santa Clara, Calif.

[21] Appl. No.: 400,040

[22] Filed: Mar. 7, 1995

[51] Int. Cl.[6] .................................................... G06F 1/08
[52] U.S. Cl. .................................................. 395/556; 395/670
[58] Field of Search ................................. 395/550, 650

[56] References Cited

U.S. PATENT DOCUMENTS

| | | | |
|---|---|---|---|
| 5,142,684 | 8/1992 | Perry et al. | 364/DIG. 1 |
| 5,241,681 | 8/1993 | Hamid et al. | 364/DIG. 1 |

OTHER PUBLICATIONS

Ron Wilson, "Opti, Green Logic Roll Notebook Chip Sets", Electronic Engineering Times, Sep. 26, 1994, p. 10.

*Primary Examiner*—Thomas M. Heckler
*Attorney, Agent, or Firm*—Blakely, Sokoloff, Taylor & Zafman

[57] ABSTRACT

An apparatus for managing the operating speed of a microprocessor is described. The apparatus adjusts the CPU clock of the microprocessor to meet the computing requirement of applications run by the microprocessor. The apparatus prevents the microprocessor from operating at peak speeds when not required, thus reducing the power consumption and heat dissipation of the microprocessor. A method for managing the operating speed of a microprocessor is also described. The method comprises the steps of determining the application that is run in the present time quantum, determining the application's computing requirement, and adjusting the microprocessor's operation speed to meet the requirement.

37 Claims, 7 Drawing Sheets

APPLICATION SPECIFIC CLOCK THROTTLING

FIELD OF THE INVENTION

The present invention relates to power management tools for computer systems. More specifically, the present invention relates to an apparatus and method for reducing the power requirement of a computer system by managing the operation of the clock driving the microprocessor.

BACKGROUND OF THE INVENTION

Advances in microprocessor technology have led to the design of new high speed microprocessors. Many of these high speed microprocessors consume significantly higher power when operating at peak performance levels. Some of these microprocessors have an average peak power consumption of as high as 8 W. While an increase in power consumption may not be a problem for desktop computer systems, it is a problem for portable systems which operate on power supplies with a limited amount of battery life.

Another problem arising from performance levels at high frequencies is increased heat dissipation. Many of these next generation microprocessors contain a significantly higher number of transistors which are driven at much higher speeds. Collectively, these transistors dissipate an increased amount of heat. Excessive heat generated by microprocessors can raise the operating temperature of the microprocessor above the recommended threshold temperature if the heat is not properly dissipated. Overheated processors can malfunction and generate incorrect results or even burn out. It is important, therefore, to manage the power consumption of these new microprocessors and to limit the amount of heat dissipated.

In the past, several approaches had been taken to deal with the problems of heat dissipation and power consumption. One approach was the implementation of temperature sensors on or near the microprocessor. These sensors triggered when the microprocessor temperature exceeded its recommended safe operating range. The system reacted to this trigger by slowing down the microprocessor. After the microprocessors had time to cool, it was allowed to return to its normal operating speed. Although this approach prevented the microprocessor from overheating, it did not provide an effective solution to the problem of excessive power consumption without affecting application performance. Rather, this solution ran the microprocessor at full speed until it approached a critical temperature range, allowing it to consume a tremendous amount of energy. Perhaps a more serious problem with this approach was the fact that a user experienced a degradation of performance when the microprocessor slowed down. When the threshold temperature is reached, all applications run by the microprocessor are automatically slowed. Standard applications run by the microprocessor experienced performance degradation. Applications with real time constraints could malfunction.

Another approach taken in the prior art to reduce power consumption and heat dissipation was the use of activity monitoring devices. Generally, activity monitoring devices monitored specific address access on an address bus. Access on that address occur when there is activity between the microprocessor and specific I/O devices. Thus, an activity monitoring device could monitor accesses between the microprocessor and the disk drive, mouse, hard drive, monitor or modem, and time the period of inactivity. When there is no access for a period of time that device may get turned off or switched to a lower power consumption mode. When the operating system realizes that multiple devices are inactive the processor is slowed down. Activity monitoring devices were effective for conserving power and reducing heat dissipation in systems during periods of inactivity. However, the approach did not offer a solution to excessive power consumption and heat dissipation when a system is continually in use. Thus, in normal operating modes of the computer, the microprocessor would continue to consume the same amount of power and dissipate the same amount of heat as if the activity monitoring device were not present.

Still another approach was the use of a manually activated external clock divider which allowed the user to decrease the speed of the microprocessor using a switch. Although this feature gave the user the ability to throttle the clock of the microprocessor and decrease the power consumption and heat dissipation of the system at any chosen time, this solution required that all applications run by the microprocessor be slowed down. The user could not discriminate between applications which were CPU intensive and applications that were not CPU intensive. All processes were run either at high speed or low speed. Thus, if a user was running multiple applications, one of which being a CPU intensive application which required the microprocessor to be run at high speed, the user could not use this solution. Throttling the clock of-the microprocessor would degrade the performance of the microprocessor for the application requiring the microprocessor to run at full power.

Thus, a method of operating a microprocessor which reduces both power consumption and heat dissipation without effecting the perceived performance of the microprocessor to the user is desired. The present invention overcomes the drawbacks of the prior art by providing an apparatus and method for operating the microprocessor at a level appropriate for each application.

SUMMARY OF THE INVENTION

The present invention relates to a method and apparatus for operating a microprocessor which reduces the power consumption and heat dissipation of the microprocessor without any user perceived degradation in performance. This method of operating the microprocessor typically includes determining the type of application that will be run by the microprocessor during a specific time quantum. This information is usually available in a computer's operating system's task scheduler. After the application is determined, the computing requirement of that process is determined. Typically, this computing requirement of a process can be obtained by reading a file prepared using a benchmark evaluator, a file prepared by a user, or a configuration file of the process itself. After the computing requirement of the process is determined, the clock speed of the microprocessor is adjusted to meet the computing requirement of the process. If the process requires that the microprocessor be operated at full power, the clock of the microprocessor operates uninterrupted. If the process requires that the processor be operated at less than full power, the invention slows the clock using a clock controller. This could be, for example, an internal or external clock divider. After the time quantum for this process expires, the invention determines the next application scheduled to be run by the operating system in the next time quantum. The invention proceeds to run through each of the previously described steps and adjusts the operating speed of the microprocessor so that it meets but does not exceed the computing requirements of the applications. This maximizes both the microprocessor's efficiency without the user noticing any performance drop in his application. User utility improves due to higher battery life and lower cooling requirements.

In one embodiment, the apparatus of the invention includes a task scheduling unit which determines the next processes to be run by a microprocessor and the amount of CPU time allocated to each process per time quantum. The apparatus further includes a clock scheduler unit coupled to the scheduling unit. In one embodiment, the clock scheduler unit may be either a circuit or a microprocessor programmed in a manner consistent with the present invention after determining the computing requirement of the processes in the scheduling unit. A clock controller unit coupled to the clock scheduler unit adjusts the operating frequency of the microprocessor to meet the computing requirement of the processes. In one embodiment, the clock controller may be a conventional external clock divider or a system controller which controls an internal clock controlling mechanism in the microprocessor.

BRIEF DESCRIPTION OF THE DRAWINGS

The present invention will be understood more fully from the detailed description given below and the accompanied drawings of the preferred embodiment of the invention. The description and drawings are not meant to limit the invention to the specific embodiment. They are provided for explanation and understanding.

DETAILED DESCRIPTION

A method and apparatus for managing the operating frequency of a microprocessor is disclosed. In the following description, numerous specific details are set forth to provide a thorough understanding of the present invention. However, it will be understood by those skilled in the art that the present invention may be practiced without these specific details. In other instances, well-known methods, procedures, components, and circuits have not been described in detail so as not to obscure the present invention.

Some portions of the detailed descriptions which follow are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical magnetic signals capable of being stored, transferred, combined, compared, and otherwise manipulated. It has proven convenient at times, principally for reasons of common usage, to refer to these signals as bits, values, elements, symbols, characters, terms, numbers, or the like. It should be kept in mind, however, that all these and similar terms are to be associated with the appropriate physical quantities and are merely convenient labels applied to these quantities. Unless specifically stated otherwise, as apparent from the following discussions, it is appreciated that throughout the present discussions utilizing terms such as "processing" or "computing" or "calculating" or "determining" or "displaying" or the like, refer to the action and processes of a computer system or similar electronic computing device that manipulates and transforms data represented as physical (electronic) quantities within the computer system's registers and memories into other data similarly represented as physical quantities within the computer system memories or registers or other such information storage, transmission or display devices.

Figure 1:
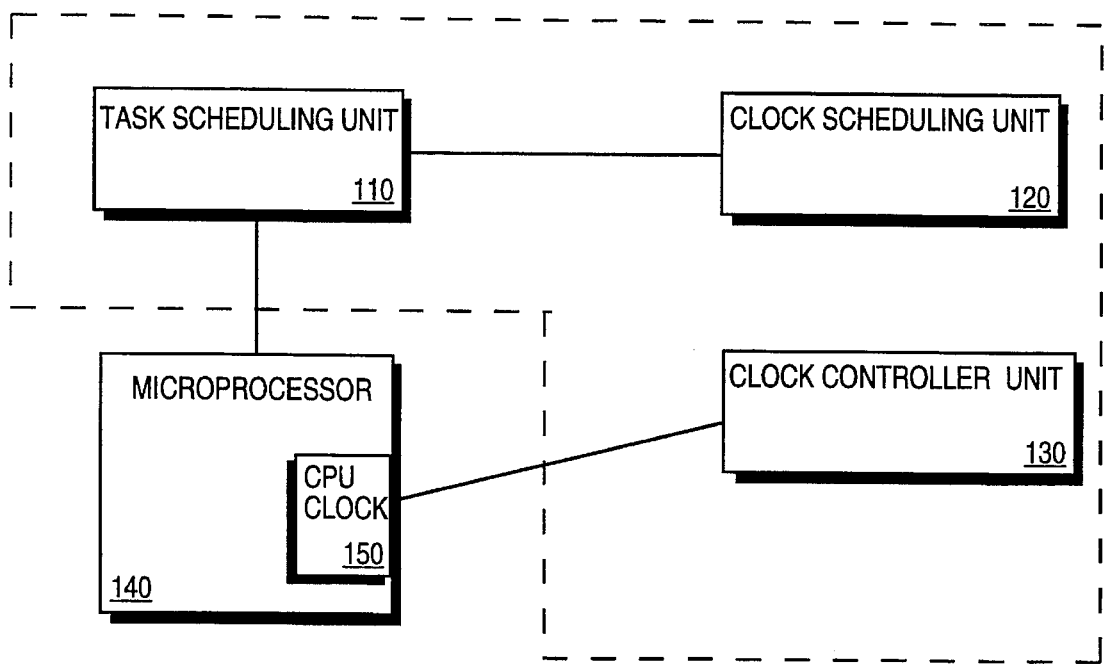
FIG. 1 illustrates an embodiment of the apparatus of the present invention in block diagram form.

FIG. 1 illustrates in block diagram form an apparatus for managing the operational frequency of a microprocessor. Apparatus 100 comprises task scheduling unit 110, clock scheduling unit 120, and clock controller unit 130. Task scheduling unit 110 can comprise logic circuitry or a general purpose microprocessor and operate under the control of software instructions as an operating system. Task scheduling unit 110 is coupled to microprocessor 140 and schedules the applications which are run by the microprocessor 140, the order in which the applications are run, and the amount of CPU time each application receives. Typically, the task scheduling unit 110 assigns each application a small unit of time, called a time quantum or time slice, when it is scheduled to run on the microprocessor 140. The task scheduling unit could run the applications in various manners. In a round-robin scheduling scheme, the task scheduler 110 maintains a list of applications that need to be run. The task scheduler runs each application in the order that it appears on the list. At the end of the time slice, the process is suspended and the next scheduled process is readied for execution. If the application has blocked or finished before the quantum has elapsed, the microprocessor switches to the next application. In a priority scheduling scheme, a priority is associated with each application. The order in which the application runs and the size of the quantum that an application receives is dependent upon its priority. Priorities can be defined either internally or externally. Internally defined priorities use some measurable quantity or quantities to compute the priority of a process. For example, time limits, memory requirements, the number of open files, and the ratio of average I/O burst to average CPU burst have been used in computing priorities. External priorities are set by criteria that are external to the operating system, such as the importance of the process.

Clock scheduling unit 120 is coupled to the task scheduling unit 110. Clock scheduling unit 120 can comprise logic circuitry or a general purpose microprocessor and operate under the control of software instructions. Clock scheduling unit 120 receives information from the task scheduling unit 110 as to which application is being run by the microprocessor 140 at a specific time quantum and determines whether the microprocessor 140 is operating at a performance level appropriate for the application. The clock scheduling unit may obtain information regarding the computing requirements of the application through a file created using a benchmark evaluator. A benchmark evaluator is a type of program which evaluates the applications run on a computer system and determines the computing needs of the application. The clock scheduling unit may also obtain information regarding the computing requirement of the application through a file created by the user. By creating ones own file, one can determine what speed to run a particular application. The clock scheduling unit may also obtain information regarding the computing requirement of an application through a configuration file written into the application software itself. The clock scheduling unit uses the clock controller unit 130 to set the clock speed of the microprocessor appropriate to the application run in the current time quantum.

Microprocessor 140 is coupled to task scheduling unit 110 and clock controller unit 130. In one embodiment of the present invention, the microprocessor 140 is coupled to the task scheduling unit 110 via an operating system. Microprocessor 140 has an internal CPU clock 150. The rate at which the microprocessor operates depends on the frequency of its clock cycle. Typically, an internal CPU clock 150 in a microprocessor is coupled to an external clock which inputs a clock pulse at a first frequency. The input of the external clock is typically sent to a phase-locked loop (PLL) in the microprocessor to be modulated to an appropriate frequency. The PLL is a feedback control circuit which compares the input of the external clock with the frequency of an internal oscillator programmed at a desired frequency. The PLL conditions the external clock frequency so that it matches the frequency of the programmed oscillator. After several cycles, the output of the PLL is synchronized to match the desired preprogrammed frequency.

The clock controller unit 130 controls the operational speed of the microprocessor 140 by controlling the frequency of the internal CPU clock 150. In one embodiment, the clock controlling unit 130 may be a support chip set which asserts and de-asserts an internal clock divider mechanism in the microprocessor 140 which throttles the internal CPU clock 150. This mechanism may be a signal which disengages the PLL in the microprocessor or a signal which disengages the output of the PLL to control units in the microprocessor. In another embodiment, clock controller unit 130 might be an external clock divider directly coupled to an external dock which directly affects the frequency of the external clock. In the preferred embodiment of the present invention, an internal clock divider which disengages the output of the PLL but maintains the synchronization of the PLL is used to adjust the clock frequency of the microprocessor. This method is preferred since it does not require the PLL to be resynchronized after the signal is asserted and de-asserted and hence frequent changes to the clock frequency may be done without significant overhead. Although disengaging the PLL saves power, the time requirement for resynchronizing the PLL is costly and might lead to the user noticing a glitch in performance.

Figure 2:
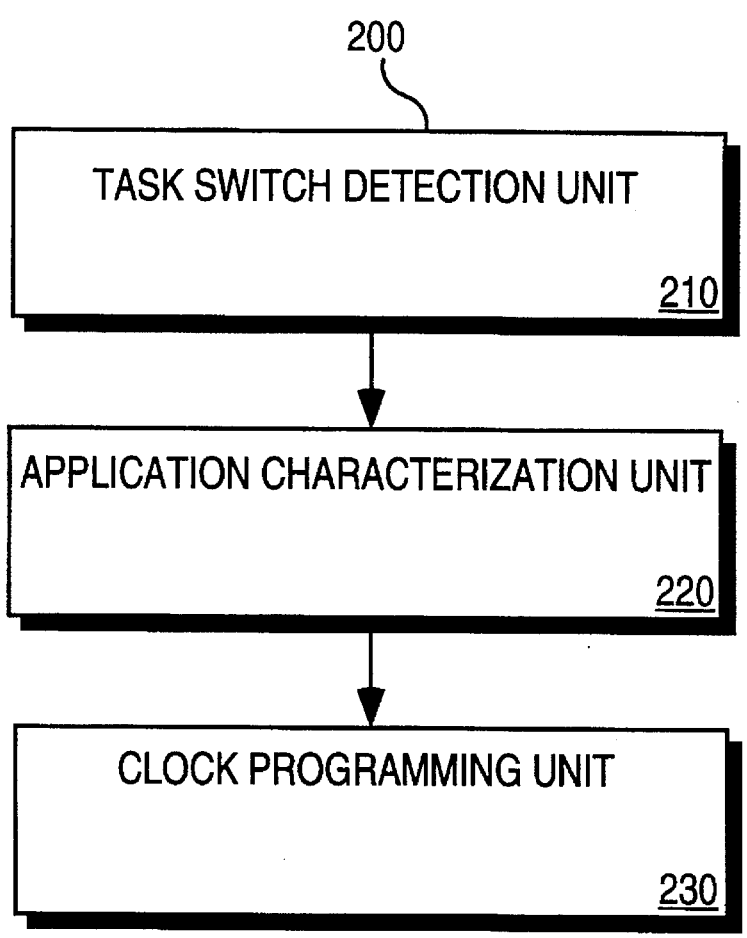
FIG. 2 shows, in block diagram form, one embodiment of a clock scheduling unit of the present invention.

FIG. 2 illustrates, in block diagram form, a clock scheduling unit 200 of a second embodiment of the present invention. Clock scheduling unit 200 can be an implementation of the clock scheduling unit of FIG. 1. Clock scheduling unit 200 comprises task switch detection unit 210, application characterization unit 220, and clock programming unit 230. Task switch detection unit 210 is coupled to application characterization unit 220. Application characterization unit 220 is coupled to clock programming unit 230. Task switch detection unit 210, application characterization unit 220, and clock programming unit 230 can comprise circuitry or a general purpose microprocessor and memory with software instructions and circuitry or a general purpose microprocessor and memory with software instructions.

Task switch detection unit 210 determines the applications run by microprocessor 140 during each current time quantum by accessing information from the task scheduling unit 110. The application characterization unit 220 determines the computing requirement for each of the applications run by microprocessor 140 by accessing information from files such as those created by using a benchmark evaluator, a user, or the application designer. The application characterization unit 220 stores this information in an initialization file for reference. This is done once. Clock programming unit 230 sets the operating speed of the microprocessor 140 at the speed required by the application run by the microprocessor by using a clock controller unit 130 to adjust the frequency of the microprocessor clock.

The present invention reduces the power consumption and thermal dissipation of a microprocessor without adversely affecting the user's perception of the application's performance. The invention dynamically adjusts the microprocessor speed to match the present active application's requirements. The present invention is thus capable of discriminating between applications which are CPU intensive and require the microprocessor to run at high speeds and applications which are not CPU intensive and do not require the microprocessor to run at high speeds. The present invention is able to achieve this even when the applications are running simultaneously in a multi-tasking environment. The present invention is also capable of adjusting the speed of the microprocessor to meet the requirements of each application without affecting the operation of other applications. Thus, the application user is unaware of any changes which the invention makes with the operating speed of the microprocessor and the user does not see any perceptible difference in performance in any of the applications.

Consider a situation where every 10 milliseconds a first application requiring the microprocessor to operate at full speed is given a time quantum of 5 milliseconds and a second application requiring the microprocessor to operate at half speed is given a time quantum of 1.5 milliseconds. The present invention would drive the clock of the microprocessor at full speed during the time quantum of the first application and reduce the speed of the clock to half speed during the time quantum of the second application. This cycle repeats continuously until one of the application quits or finishes processing. The present invention schedules the clock so that the microprocessor does not operate at peak speeds when it is not required. This reduces its power consumption and thermal dissipation. Prior art approaches were ineffective in reducing power consumption and heat dissipation of microprocessors which were running multiple applications. Solutions which attempted to adjust the clock of the microprocessor had to either slow down or speed up the clock speed for all applications run by the microprocessor, causing either inefficient operation of the microprocessor or performance degradation in cases of time critical applications.

In the embodiment of the present invention illustrated in FIG. 2, the invention can be implemented for any application without imposing any additional requirements on the application designer. For example, if a user is running a commercial software application, the application characterization unit 220 needs to determines the computing requirement for running this application. However, even if the developers of this particular software application neglected to provide a configuration file containing this information, the user can still obtain this information by using a benchmark evaluator program or provide the application characterization unit with this information himself in a user created file. Thus, the present invention can be implemented to adjust the clock speed of a computer system running any application.

Figure 3:
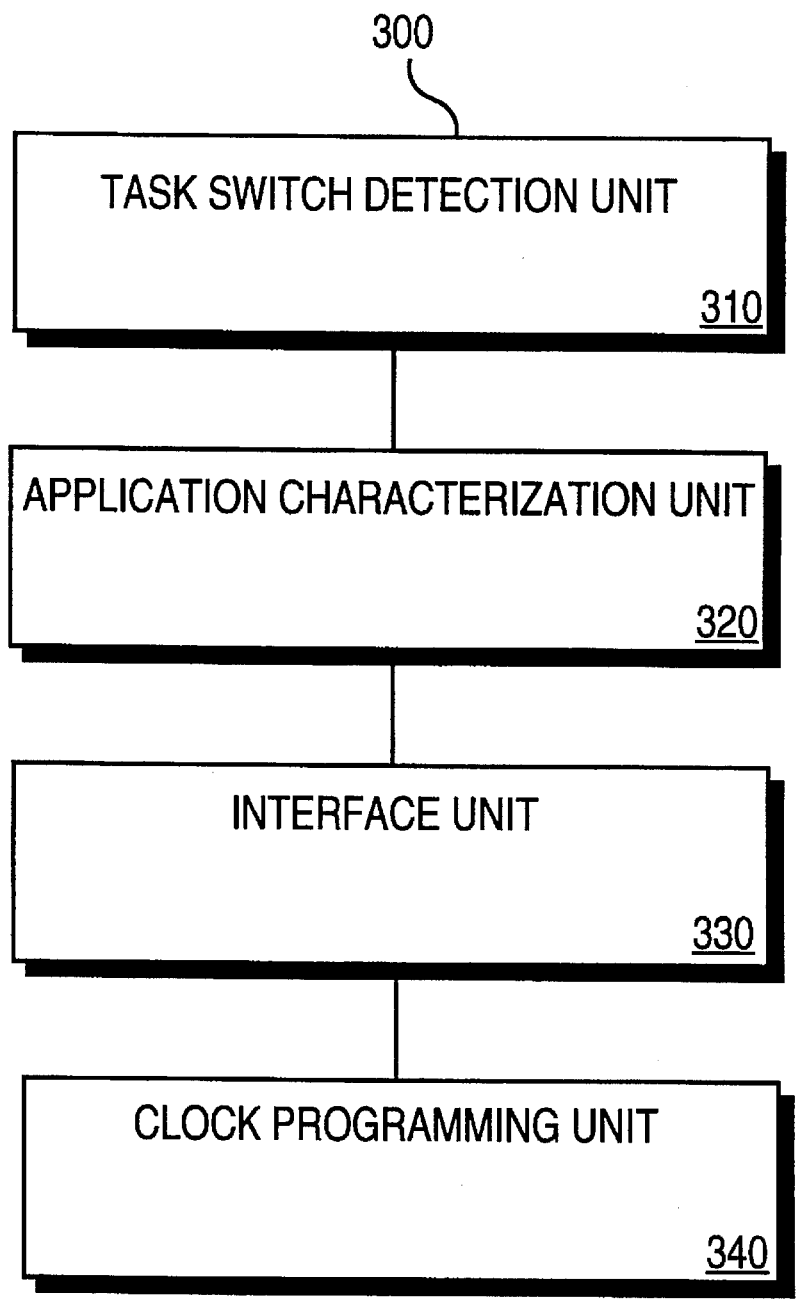
FIG. 3 shows, in block diagram form, a second embodiment of a clock scheduling unit of the present invention.

FIG. 3 illustrates, in block diagram form, a clock scheduling unit 300 of a third embodiment of the present invention. Clock scheduling unit 300 can be an implementation of the clock scheduling unit of FIG. 1. Clock scheduling unit 300 comprises task switch detection unit 310, application characterization unit 320, interface unit 330 and clock programming unit 340. Task switch detection unit 310 is coupled to application characterization unit 320. Application characterization unit further comprises interface unit 330. Application characterization unit 320 is coupled to clock programming unit 340. Task switch detection unit 310, application characterization unit 320, interface unit 330, and clock programming unit 340 can comprise circuitry, or a general purpose microprocessor and memory with software instructions and circuitry, or a general purpose microprocessor and memory with software instructions.

Task switch detection unit 310 determines the applications scheduled by the operating system to be run by microprocessor 140 during each time quantum by accessing information from the task scheduling unit 110. The application characterization unit 320 determines the computing requirement of each of the applications by accessing information from files such as those written by a benchmark evaluator, a user, or the application designer. Interface unit 330 allows certain applications to interface directly with the characterization unit 320 and transfer information about the computing requirement of specific operations currently run by these application. By allowing certain applications to update computing requirement information in the application characterization unit 320, the interface unit 330 gives the clock scheduling unit 300 the additional capability of determining the computing requirement of specific operations in an application and setting the operating speed of the microprocessor to meet these requirements. This feature is especially useful for running applications with time varying computing requirements. For example, in a spreadsheet program, the microprocessor is required at times to perform several complex computations in a short period of time. This could occur when a user wishes to do a page compute. In these situations, the microprocessor should be set to operate at a high speed. Other times, however, the microprocessor is only required to record data entries into the spreadsheet program. In these situations, the microprocessor does not need to operate at high speed and should be slowed down to minimize power consumption and heat dissipation. The present invention is capable of discriminating between the computing requirements of various applications run by a microprocessor and provides techniques for adjusting the computing requirements of various tasks within those application. This allows the present invention to maximize power efficiency and minimize the heat dissipation of the microprocessor.

Figure 4:
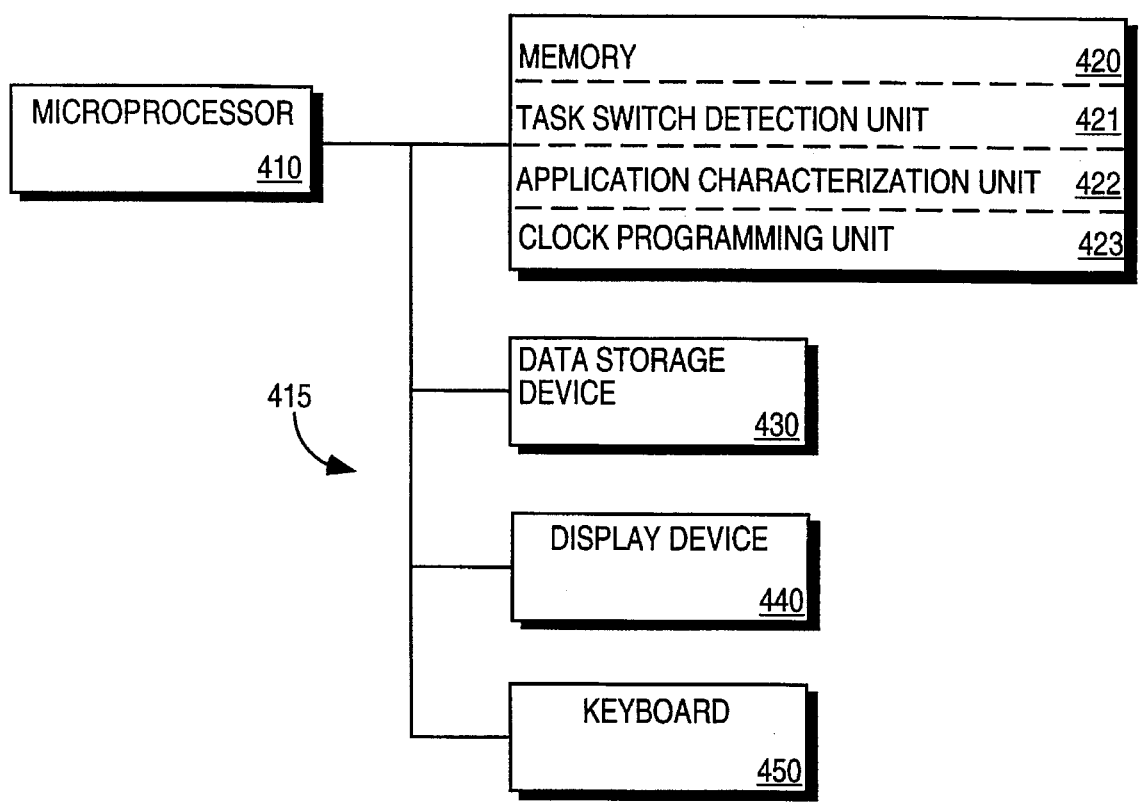
FIG. 4 is a block diagram illustrating a typical computer system which may implement one embodiment of the present invention.

FIG. 4 illustrates in block diagram form a typical computer system of a fourth embodiment of the present invention. Computer system 400 comprises bus 415, microprocessor 410, memory 420, data storage device 430, display device 440, and keyboard controller 450.

Microprocessor 410 can be a complex instruction set computing (CISC) microprocessor, reduced instruction set computing (RISC) microprocessor or other processor device. Microprocessor executes instructions or code stored in memory 420 and performs operations on data stored in memory 420.

Memory 420 is coupled to the microprocessor 410 through bus 415. Memory 420 can be a dynamic random access memory (DRAM), static random access memory (SRAM) or other memory device. Memory 420 can store instruction or code that are part of application programs, operating system programs or other computer programs. Memory 420 can transfer instructions or code that make up application programs, operating system programs or other computer programs to the microprocessor 410. Memory 420 stores a first plurality of processor executable instructions, a second plurality of processor executable instructions, and a third plurality of processor executable instructions. Task switch detection unit 421 comprises the first plurality of processor executable instructions which is executable by processor 410 in the manner shown in FIG. 6. Application characterization unit 422 comprises the second plurality of processor executable instructions which is executed by 410 processor in the manner shown in FIG. 6. Clock programming unit 423 comprises the third plurality of processor executable instruction stored in memory which is executed by 410 processor in the manner shown in FIG. 6.

Computer system 400 further comprises a data storage device 430 such as a hard, floppy, or optical disk drive which is coupled to bus 415. Display device 440 is also coupled to bus 415. Display device 440 may be a cathode ray tube (CRT) for displaying information to a computer user. An alphanumeric input device 450, including alphanumeric and other keys, may also be coupled to bus 415 for communicating information to microprocessor 410.

Figure 5:
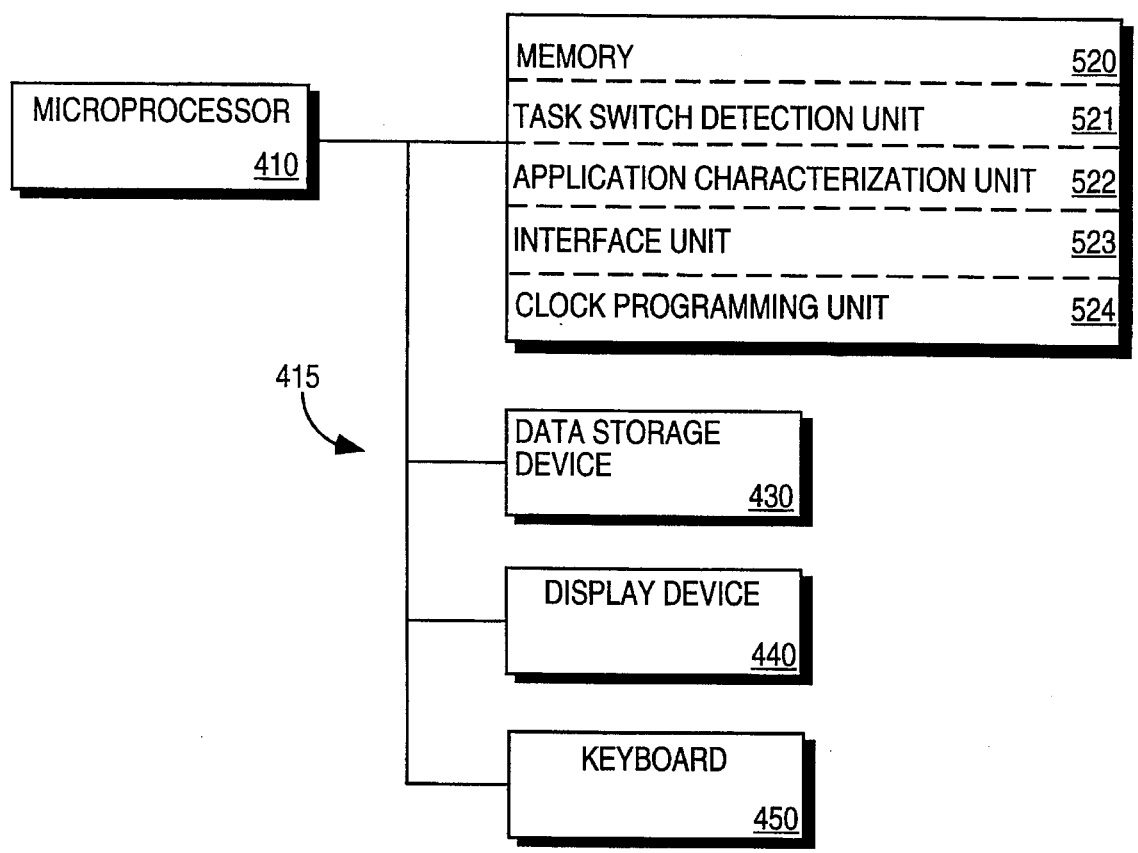
FIG. 5 is a block diagram illustrating a typical computer system which may implement a second embodiment of the present invention.

In another embodiment of the present invention illustrated in FIG. 5, memory 520 stores a first plurality of processor executable instructions, a second plurality of processor executable instructions, a third plurality of processor executable instructions, and a fourth plurality of processor executable instructions. Task switch detection unit 521 comprises the first plurality of processor executable instructions which is executable by the processor 410 in the manner shown in FIG. 7. Application characterization unit 522 comprises the second plurality of processor executable instructions which is executable by the processor 410 in the manner shown in FIG. 7. Interface unit 523 comprises the third plurality of processor executable instructions which is executable by the processor 410 in the manner shown in FIG. 7. Clock programming unit 524 comprises the fourth plurality of executable instructions stored in memory which is executed by processor 410 in the manner shown in FIG. 7.

Figure 6:
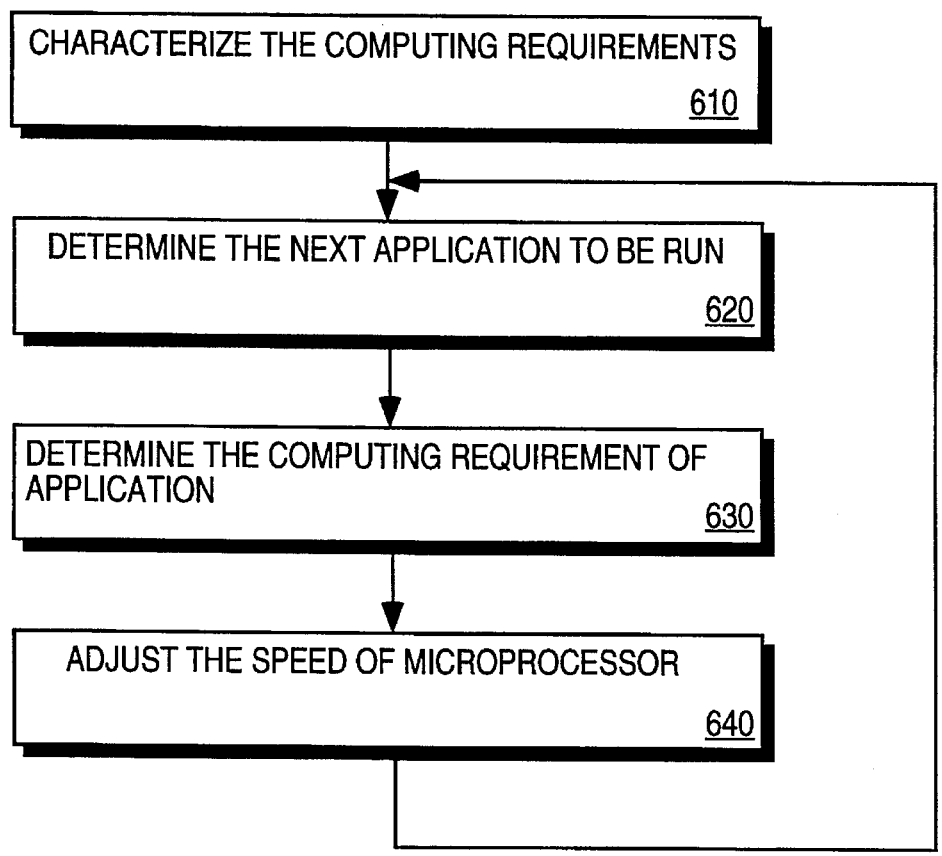
FIG. 6 is a flow chart showing one embodiment of a method according to the present invention.

FIG. 6 illustrates the operation of the clock scheduling unit of an embodiment of the present invention in flow chart diagram form. First, the clock scheduling unit retrieves information regarding the computing requirement of applications to be run by the microprocessor by accessing files such as those prepared by using a benchmark evaluator, a user, or the application designer, as shown in block 610. This configuration information is recorded in an initialization file for reference and read into memory. Next, the clock scheduling unit determines the scheduled application to be run by the microprocessor in the next quantum. Typically, the clock scheduling unit accesses this information from a task scheduling unit which prioritizes each application and determines the amount of CPU time each application receives. In one embodiment of the present invention, the task scheduling unit is in the operating system of the computer system. This step is shown in block 620. The clock scheduling unit then determines the computing requirement of this application by referencing the configuration information read into memory, as shown in block 630. If this information is not in memory, the dock scheduling unit searches for the information by performing a configuration read of the application to be run. After the information is found, it is loaded into memory and the clock scheduling unit adjusts the speed of the microprocessor to meet the computing requirement of the application. Typically, clock scheduling unit utilizes a clock controller unit to throttle the CPU clock. The clock controller may be either an internal or external clock throttling mechanism. This is shown in block 640. The clock scheduling unit then returns to block 620 and repeats the previously described steps to adjust the speed of the microprocessor to match the computing requirement of the application to be run in the next quantum.

Figure 7:
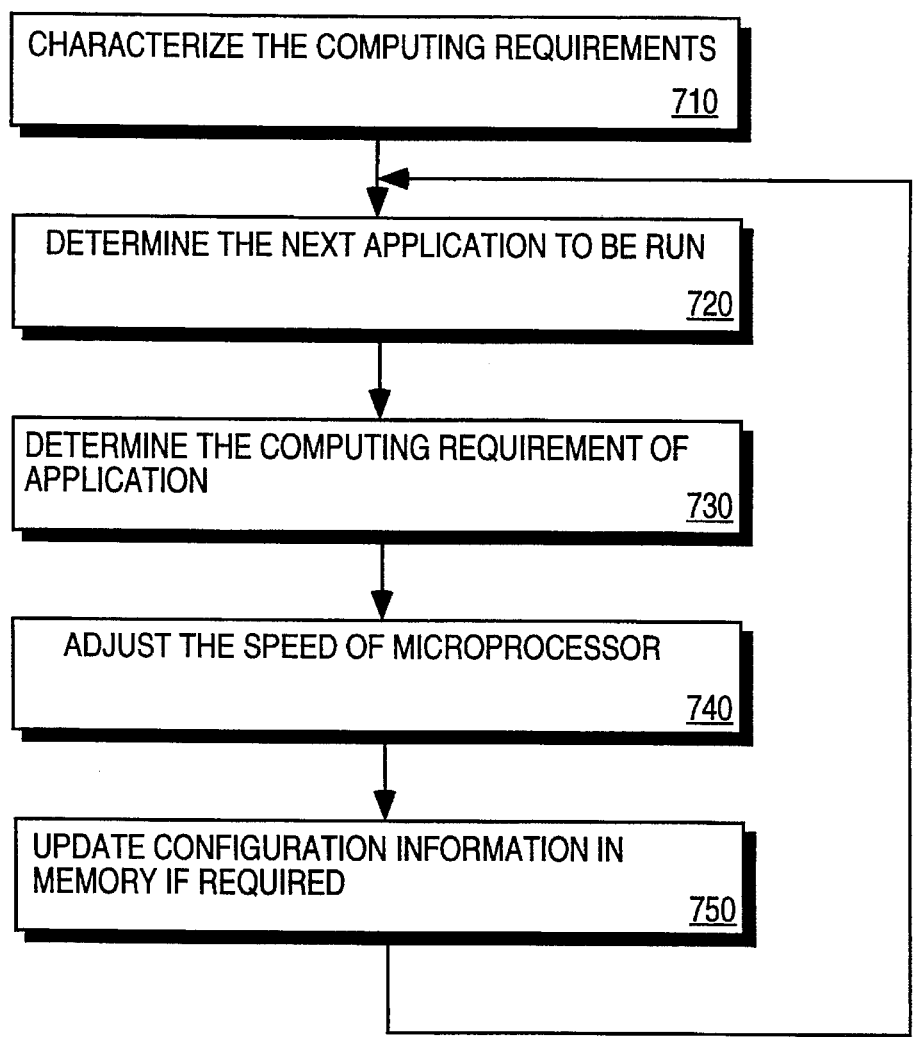
FIG. 7 is a flow chart showing a second embodiment of a method according to the present invention.

FIG. 7 illustrates in flow chart diagram form the operation of the clock scheduling unit of another embodiment of the present invention. The clock scheduling unit retrieves information regarding the computing requirement of applications to be run by the microprocessor by accessing files such as those prepared by using a benchmark evaluator, a user, or the application designer, as shown in block 710. The configuration information is recorded in an initialization file for reference and read into memory. The clock scheduling unit can also characterize the computing requirement for a specific operation to be performed by an application. The clock scheduling unit allows the application to directly transmit the configuration information regarding the computing requirement of operations to the clock scheduling unit. The computing requirement for the specific operation is recorded as the computing requirement for the specific application in its internal data structures. Next, the clock scheduling unit determines the scheduled application to be run by the microprocessor in the next quantum. Typically, the clock scheduling unit accesses this information from a task scheduling unit which prioritizes each application and determines the amount of CPU time each application receives. This is shown in block 720. The clock scheduling unit then determines the computing requirement of this application by referencing the configuration information read into memory, as shown in block 730. If this information is not in memory, the clock scheduling unit searches for the information by performing a configuration read of the application to be run. After the information is found, it is loaded into memory and the clock scheduling unit adjusts the speed of the microprocessor to meet the computing requirement of the application. Typically, clock scheduling unit utilizes a clock controller unit to throttle the CPU clock. The clock controller may be either an internal or external clock throttling mechanism. This is shown in block 740. Next, the clock scheduling unit updates configuration information in memory, as shown in block 750. The clock scheduling unit allows applications running new operations to directly transmit information regarding the computing requirement of these new operations into the internal data structures. The computing requirement for these operations are recorded as the computing requirement for their appropriate applications. The clock scheduling unit then returns to block 720 and repeats the previously described steps to adjust the speed of the microprocessor to match the computing requirement of an application or specific operation run in the next quantum.

Thus, a method and apparatus of operating a microprocessor which reduces both power consumption and heat dissipation without affecting the performance of the microprocessor to the user's perspective has been described.

What is claimed is:

1. An apparatus for managing a microprocessor's operating speed, comprising:

A) a task scheduling unit that schedules a time when an application is run by the microprocessor;

B) a clock scheduling unit, coupled to the task scheduling unit, that determines a computing requirement of the application, comprising 1) a task switch detection unit that communicates with the task scheduling unit and determines the time when the application is scheduled to run, 2) an application characterization unit coupled to the task switch detection unit that prepares an initialization file with computing requirement data of the application, and 3) a clock programming unit coupled to the application characterization unit that programs the clock controller unit to throttle a clock in the microprocessor according to the computing requirement data in the initialization file; and C) a clock controller unit, coupled to the clock scheduling unit, that adjusts the microprocessor's operating speed to meet the computing requirement of the application.

2. The application characterization unit in claim 1 wherein the application characterization unit prepares the initialization file with computing requirement data of the application by accessing information in a file prepared by using a benchmark evaluator.

3. The application characterization unit in claim 1 wherein the application characterization unit prepares the initialization file with computing requirement data of the application by accessing information in a file containing computing requirement data prepared by a user.

4. The application characterization unit in claim 1 wherein the application characterization unit prepares the initialization file with computing requirement data of the application by accessing information in a file prepared by an application designer.

5. The apparatus in claim 1 wherein the application characterization unit further comprises an interface unit for allowing the application to update its computing requirement according to an operation run in the application.

6. An apparatus for managing a microprocessor's operating speed, comprising:

a task scheduling unit that schedules a time when an application is run by the microprocessor:

a clock scheduling unit, coupled to the task scheduling unit, that determines a computing requirement of the application; and a clock controller unit, coupled to the clock scheduling unit, comprising an external clock throttling mechanism that adjusts the microprocessor's operating speed to meet the computing requirement of the application.

7. An apparatus for managing a microprocessor's operating speed, comprising:

a task scheduling unit that schedules a time when an application is run by the microprocessor;

a clock scheduling unit, coupled to the task scheduling unit, that determines a computing requirement of the application; and a clock controller unit, coupled to the clock scheduling unit, comprising an internal clock throttling mechanism that adjusts the microprocessor's operating speed to meet the computing requirement of the application.

8. The apparatus of claim 7 wherein the internal clock throttling mechanism disengages a phase lock loop circuit in the microprocessor.

9. The apparatus of claim 7 wherein the internal clock divider mechanism disengages an output line from a phase lock loop circuit in the microprocessor without disengaging the phase lock loop circuits.

10. A computer system comprising:

A) a bus;

B) a microprocessor, coupled to the bus, processing digital data;

C) a memory, coupled to the bus, storing digital data;

D) an apparatus that manages a microprocessor's operating speed, comprising:

1) a task scheduling unit that schedules a time when an application is run by the microprocessor;

2) a clock scheduling unit, coupled to the task scheduling unit, that determines a computing requirement of the application, comprising a) a task switch detection unit that communicates with the task scheduling unit and determines the time when the application is scheduled to run, b) an application characterization unit coupled to the task switch detection unit that prepares an initialization file with computing requirement data of the application, and c) a clock programming unit coupled to the application characterization unit that programs the clock controller unit to throttle a clock in the microprocessor according to the computing requirement data in the initialization file; and 3) a clock controller unit, coupled to the clock scheduling unit, that adjusts the microprocessor's operating speed to meet the computing requirement of the application.

11. The application characterization unit in claim 10 wherein the application characterization unit prepares the initialization file with computing requirement data of the application by accessing information in a file prepared by using a benchmark evaluator.

12. The application characterization unit in claim 10 wherein the application characterization unit prepares the initialization file with computing requirement data of the application by accessing information in a file containing computing requirement data prepared by a user.

13. The application characterization unit in claim 10 wherein the application characterization unit prepares the initialization file with computing requirement data of the application by accessing information in a file prepared by an application designer.

14. The apparatus in claim 10 wherein the application characterization unit further comprises an interface unit for allowing the application to update its computing requirement according to an operation run in the application.

15. A computer system, comprising:

A) a bus;

B) a microprocessor, coupled to the bus, that processes digital data;

C) a memory, coupled to the bus, that stores digital data:

D) an apparatus that manages a microprocessor's operating speed, comprising 1) a task scheduling unit that schedules a time when an application is run by the microprocessor, 2) a clock scheduling unit, coupled to the task scheduling unit, that determines a computing requirement of the application, and 3) a clock controller unit, coupled to the clock scheduling unit, comprising an external clock throttling mechanism that adjusts the microprocessor's operating speed to meet the computing requirement of the application.

16. A computer system, comprising:

A) a bus;

B) a microprocessor, coupled to the bus, that processes digital data:

C) a memory, coupled to the bus, that stores digital data;

D) an apparatus that manages a microprocessor's operating speed, comprising 1) a task scheduling unit that schedules a time when an application is run by the microprocessor, 2) a clock scheduling unit, coupled to the task scheduling unit, that determines a computing requirement of the application, and 3) a clock controller unit, coupled to the clock scheduling unit, comprising an internal clock throttling mechanism that adjusts the microprocessor's operating speed to meet the computing requirement of the application.

17. The apparatus of claim 16 wherein the internal clock throttling mechanism disengages a phase lock loop circuit in the microprocessor.

18. The apparatus of claim 16 wherein the internal clock divider mechanism disengages a phase lock loop circuit in the microprocessor.

19. A method for managing a microprocessor's operation speed, comprising:

determining an application to be run by the microprocessor;

determining a computing requirement for the application; and adjusting the microprocessor's operation speed to meet the computing requirement of the application by asserting or de-asserting an internal CPU clock throttling mechanism, wherein the internal CPU clock throttling mechanism is a clock divider mechanism that disengages a phase lock loop circuit in the microprocessor.

20. A method for managing a microprocessor's operation speed, comprising:

determining an application to be run by the microprocessor:

determining a computing requirement for the application; and adjusting the microprocessor's operation speed to meet the computing requirement of the application by asserting or de-asserting an internal CPU clock throttling mechanism, wherein the internal CPU clock throttling mechanism disengages an output line from a phase lock loop circuit in the microprocessor without disengaging the phase lock loop circuit in the microprocessor.

21. A method for managing a microprocessor's operating speed, the method comprising the steps of:

determining an application to be run by the microprocessor;

determining a computing requirement of the application from computing requirement data in an initialization file;

adjusting the microprocessor's operating speed to meet the computing requirement of the application; and updating computing requirement data in the initialization file according to a new operation run in the application.

22. The method of claim 21 wherein determining the application to be run by the microprocessor comprises retrieving information from a task scheduler.

23. The method of claim 21 wherein determining the computing requirement of the application comprises accessing information in a file prepared by using a benchmark evaluator.

24. The method of claim 21 wherein determining the computing requirement of the application comprises accessing information in a file containing computing requirement data prepared by a user.

25. The method of claim 21 wherein determining the computing requirement of the application comprises accessing information from a file prepared by the application's designer.

26. The method of claim 21 wherein an interface unit allows the application to update the computing requirement data in the initialization file.

27. The method of claim 21 wherein adjusting the microprocessor's operating speed comprises asserting or de-asserting a CPU block throttling mechanism.

28. The method of claim 27 wherein the clock controller mechanism comprises an external clock throttling mechanism.

29. The method of claim 27 wherein the clock controller mechanism comprises an internal clock throttling mechanism.

30. The method of claim 29 wherein the internal clock divider mechanism is clock divider mechanism which disengages a phase lock loop circuit in the microprocessor.

31. The method of claim 29 wherein the internal clock divider mechanism is a mechanism which disengages an output line from a phase lock loop circuit in the microprocessor without disengaging off the phase lock loop circuit in the microprocessor.

32. A computer-readable medium having stored thereon sequences of instructions, the sequcnes of instructions including instructions which, when executed by a processor, causes the processor to perform the steps of:

determining an application to be run by the microprocessor;

determining a computing requirement of the application from computing requirement data in an initialization file;

adjusting the microprocessor's operating speed to meet the computing requirement of the application; and updating computing requirement data in the initialization file according to a new operation run in the application.

33. The computer-readable medium of claim 32, wherein the step of determining the application to be run by the microprocessor comprises retrieving information from a task scheduler.

34. The computer-readable medium of claim 32, wherein the step of determining the computing requirement of the application comprises accessing information in a file prepared by using a benchmark evaluator.

35. The computer-readable medium of claim 32, wherein the step of determining the computing requirement of the application comprises accessing information in a file containing computing requirement data prepared by a user.

36. The computer-readable medium of claim 32, wherein the step of determining the computing requirement of the application comprises accessing information from a file preapred by the application's designer.

37. The computer-readable medium of claim 32, wherein the step of adjusting the microprocessor's operating speed comprises asserting or de-asserting a CPU clock throttling mechanism.

* * * * *

UNITED STATES PATENT AND TRADEMARK OFFICE
CERTIFICATE OF CORRECTION

PATENT NO.    : 5,623,647
DATED         : April 22, 1997
INVENTOR(S)   : Amit K. Maitra It is certified that error appears in the above-identified patent and that said Letters Patent is hereby corrected as shown below:

In column 5 at line 42 delete "dock" and insert --clock--

In column 8 at line 65 delete "dock" and insert --clock--

Signed and Sealed this

Nineteenth Day of August, 1997

Attest:

BRUCE LEHMAN

*Attesting Officer*        *Commissioner of Patents and Trademarks*